United States Patent Office 3,329,699
Patented July 4, 1967

3,329,699
SECO-EBURICENE- AND EBURICADIENETRIOLS AND ACID DERIVATIVES THEREOF
Allen I. Laskin, Griggstown, and Josef Fried, Princeton, N.J., assignors, by mesne assignments, to E. R. Squibb & Sons, Inc., New York, N.Y., a corporation of Delaware
No Drawing. Filed Sept. 13, 1963, Ser. No. 308,696
14 Claims. (Cl. 260—456)

This invention relates to and has for its objects the provision of new physiologically active compounds, processes for their production and new intermediates useful in preparing the same.

The final products of this invention may be represented by the formulae

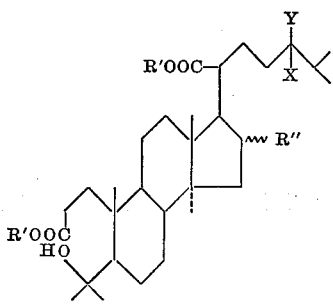

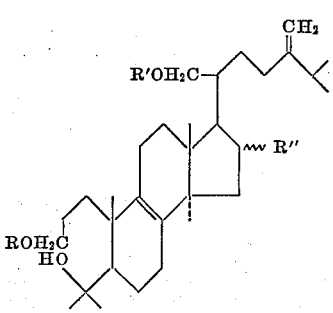

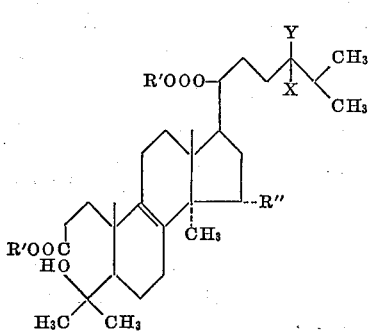

and

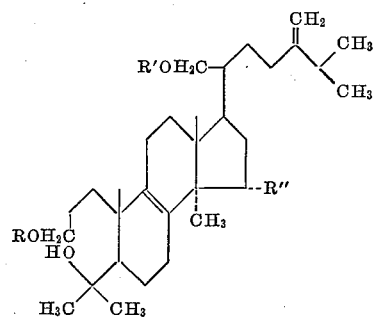

wherein Y is selected from the group consisting of lower alkyl (e.g. methyl) and hydroxy lower alkyl (e.g. hydroxy methyl); X is selected from the group consisting of hydrogen and hydroxy; each R' is selected from the group consisting of hydrogen and lower alkyl; each R'' is selected from the group consisting of hydrogen, hydroxy and acyloxy; and R is selected from the group consisting of hydrogen and acyl.

The final products of this invention possess antibiotic activity and may be effectively employed for such purposes against such microorganisms as penicillin resistant strains of *Staphylococcus aureus*. The final products of this invention may be employed for such purposes in the amounts and dosages based on the activity of the particular compound. The compounds of this invention may be administered topically alone, or in combination with a pharmaceutically acceptable carrier.

The compounds of this invention may be prepared according to the processes of this invention employing a triterpenoid acid as a starting material. Among the triterpenoid acids which may be employed in this invention are included such acids as eburicoic acid, tumulosic acid, pinicolic acid, polyporenic acid, elemolic acid, elemonic acid, dehydroeburicoic acid, dehydroelemolic acid, dehydroelemonic acid, sulfurenic acid and other like acids. In the case of such acids as tumulosic acid and sulfurenic acid, a 16 and 15 substituent is present respectively. As the steps of the process are carried out the final products of this invention when derived from tumulosic or sulfurenic acid will possess a 16 or 15 substituent, as the case may be. Sulfurenic acid is derived according to the procedures described in copending application Ser. No. 308,667, filed on even date herewith in the name of Josef Fried, and now U.S. Patent No. 3,271,390. It should be noted that when tumulosic acid or sulfurenic acid is employed in the processes set forth hereinafter, the compounds derived are the 16 and 15 substituted derivatives of the compounds obtained in the employment of eburicoic acid. These 16 and 15 substituted derivatives are also new compounds of this invention.

[In this application and in the appended claims, whenever in the formulae set forth herein a curved line (∫) is employed in the linkage of atoms, it is meant to denote that the connected atom may be either in the alpha or beta position, as is determined in the respective compounds involved.]

The steps of the process of this invention may be represented by the following equations employing eburicoic acid as the starting material, wherein R', X and Y are as hereinbefore defined, R may be hydrogen or acyl; and $R_1$ may be hydrogen or lower alkyl.

invention are: stearic acid, palmitic acid, oleic acid, linoleic acid and myristic acid.

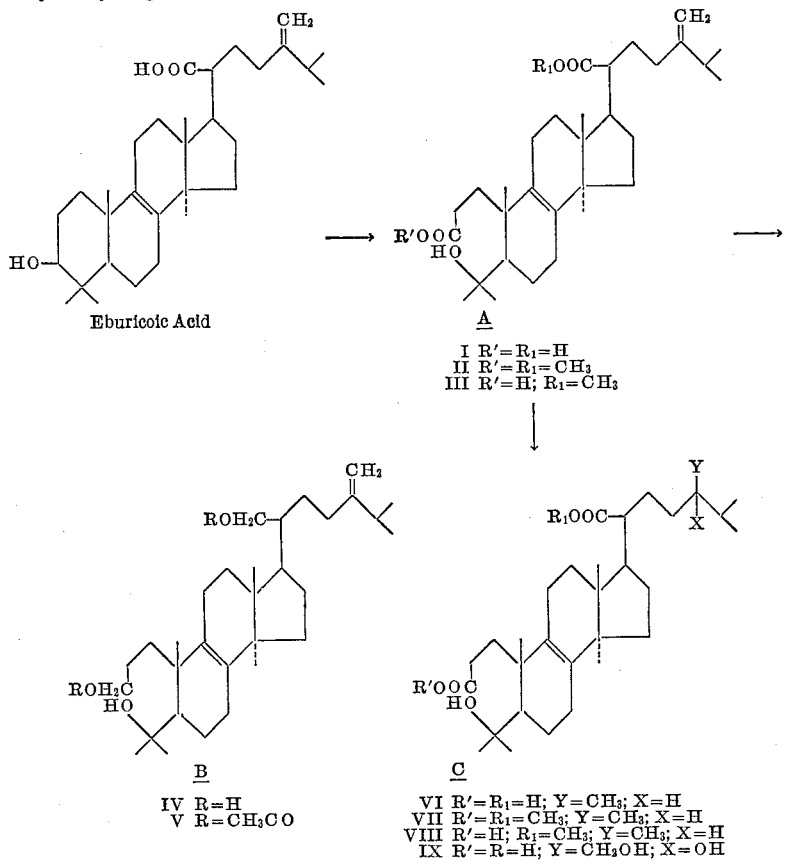

In the first step of the process of this invention, the chosen triterpenoid acid is subjected to the action of a microorganism of the genus Glomerella, or to the action of the enzymes thereof, under oxidizing and preferable aerobic conditions, and further, this new compound may be further treated to yield the other new compounds of this invention.

The microorganisms of the genus Glomerella which may be employed in the practice of this invention include such microorganisms as *Glomerella fusarioides, G. glycines* and *G. cingulata*.

To prepare the compounds of this invention, a triterpenoid acid is first subjected to the action of enzymes of a microorganism of the genus Glomerella under oxidizing conditions. This oxidation can best be effected either by including the triterpenoid acid in an aerobic culture of the microorganism, or by bringing together, in an aqueous medium, the compounds, air and enzymes of non-proliferating cells of the microorganism.

In general, the conditions of culturing the Glomerella microorganism for the purposes of this invention are (except for the inclusion of the triterpenoid acid to be converted), the same as those of culturing various other microorganisms for the production of antibiotics, vitamin $B_{12}$, and other like substances. The microorganism is grown aerobically in contact with (in or on) suitable fermentation medium. A suitable medium essentially comprises a source of carbon and energy. The latter may be a carbohydrate (such as sucrose, molasses, glucose, maltose, starch, or dextrin), a fatty acid, a fat and/or the compounds itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this The source of nitrogenous factors utilizable for the purposes of this invention may be organic (e.g. soybean meal, cornsteep liquor, meat extract and/or distiller's solubles) or synthetic (i.e., composed of simple, synthesizable organic or inorganic compounds such as ammonium salts, alkali nitrates, amino acids or urea).

An adequate sterile air supply should be maintained during fermentation, for example, by the conventional methods of exposing a large surface of the medium to air, or by utilizing submerged aerated culture. The compound may be added to the culture during the incubation period, or included in the medium prior to sterilization or inoculation. The preferred (but not limiting) range of the concentration of the compound in the culture is about 0.01 to about 0.10%. The culture period (or rather the time of subjecting the compound to the action of the enzyme) may vary considerably, the range of about 1 to 7 days being feasible, but not limiting.

The process yields, inter alia, 3,4-seco-$\Delta^{8,24(28)}$-eburicadiene-4-ol-3,21-dioic acid (Compounds A, wherein $R_1$ and $R'=H$), which may be separated from the broth by extraction or filtration and from other concomitantly produced compounds by fractional crystallization.

The 3,4-seco-$\Delta^{8,24(28)}$-eburicadiene-4-ol-3,21-dioic acid may then be alkylated as by treatment with an alkylating agent, for example, ethereal diazomethane to obtain the dimethyl ester thereof (Compounds A, wherein $$R_1=R'=CH_3)$$

The monomethyl ester of Compounds A may then be obtained by treatment of the dimethyl ester with an alkali metal base, such as potassium hydroxide. Compounds A are new compounds of this invention.

Compounds A may then be reduced as by treatment with a reducing agent, e.g., palladium on charcoal, to yield the 3,4-seco-$\Delta^8$-eburicene-4-ol-3,21-dioic acids (Compounds C, wherein $Y=CH_3$), which are also new products of this invention.

Compounds A may also be treated with an oxidizing agent, e.g., osmium tetroxide, to yield the 3,4-seco-$\Delta^8$-eburicene-4,24,28-triol-3,21-dioic acid (Compounds C, wherein Y=CH$_2$OH) which also are new compounds of this invention.

The preferred acyl radicals of this invention are those of hydrocarbon carboxylic acids of less than twelve carbon atoms, as exemplified by the lower alkanoic acids (e.g. acetic, propionic, butyric and tert-pentanoic acids), the lower alkanoic acids, the monocyclic aryl carboxylic acids (e.g., benzoic and toluic acids), the monocyclic aryl lower alkanoic acids (e.g., phenacetic and β-phenylpropionic acid), the cycloalkane carboxylic acids and the cycloalkene carboxylic acids.

The invention may be further illustrated by the following examples:

EXAMPLE 1

*3,4-Seco-$\Delta^{8,24(28)}$-eburicadiene-4-ol-3,21-dioic acid (I)*

(A) FERMENTATION OF EBURICOIC ACID

A fermentation medium of the following compositions is prepared:

|  | G. |
|---|---|
| Dextrose | 10 |
| Cornsteep liquor | 6 |
| NH$_4$H$_2$PO$_4$ | 3 |
| Difco yeast extract | 2.5 |
| CaCl$_3$ | 2.5 |
| Water, to make 1 liter. | |

The pH of the medium is adjusted to 7.0±0.1 with 2 N NaOH solution, and 50 ml. portions of the medium are distributed in 250 ml. Erlenmeyer flasks, the flasks plugged with cotton and sterilized by autoclaving for 30 minutes at 120° C. When cool, two of the flasks are each inoculated with 1 ml. of a suspension of the surface growth of 21-day-old agar slant (10 g. glucose; 2.5 g. yeast extract; 1 g. K$_2$HPO$_4$; 20 g. agar; distilled water to one liter) culture of *Glomerella fusarioides* (ATCC 9552), the suspension being made in 2.5 ml. of water with 0.01% of sodium lauryl sulfate as a wetting agent.

The flasks are then mechanically shaken for 72 hours at 25° C. on a 280 cycle per minute rotary shaker, after which about 10% (v./v.) is transferred to each of 50 flasks each containing 50 ml. of the fresh sterile fermentation medium described above. Eburicoic acid is then added by supplementing each flask with 0.25 ml. of a sterile solution of the steroid in N,N-dimethylformamide (60 mg./ml.) so that the medium contains 300 μg./ml. of the steroid. The flasks are then incubated an additional 168 hours, after which the flasks are harvested and the contents filtered through a Seitz clarifying pad and washed with successive 50 ml. portions of warm water. The combined filtrate and washings are adjusted to pH 4.0 with glacial acetic acid and the flocculent precipitate which develops is collected by filtration.

(B) ISOLATION OF 3,4-SECO-$\Delta^{8,24(28)}$-EBURICADIENE-4-OL-3,21-DIOIC ACID

The filter cake obtained on filtration of the acidified culture broth is dissolved in methlisobutyl ketone, filtered and the filtrate evaporated to dryness in vacuo. The residual material is triturated with ether and the resulting crystals recrystallized from acetone. The pure 3,4-seco-$\Delta^{8,24(28)}$-eburicadiene-4-ol-3,21-dioic acid has the following properties: M.P. 236–238°; [α]$_D^{23}$+78° (c., 0.54 in ethanol)

$\lambda_{max}^{KBr}$ 3.00, 5.87, 6.10, 11.25μ

*Analysis.*—Calcd. for C$_{31}$H$_{50}$O$_5$ (502.71): C, 74.06; H, 10.03. Found: (after drying at 140° to constant weight) C, 73.61; H, 10.59; C, 73.67; H, 10.59.

Neutralization equivalent: 250; Calcd.: 251

NMR (pyridine): 5.07τ (singlet, 2 protons at C$_{28}$), 8.50, 8.52τ (two methyl groups at C$_4$).

EXAMPLE 2

*3,4-seco-$\Delta^{8,24(28)}$-eburicadiene-4-ol-3,21-dioic acid 3,21-dimethyl ester (II)*

3,4-seco-$\Delta^{8,24(28)}$-eburicadiene - 4-ol - 3,21-dioic acid is treated with ethereal diazomethane in six ml. of methanol, to yield 3,4-seco-$\Delta^{8,24(28)}$-eburicadiene - 4-ol-3,21 - dioic acid 3,21-dimethyl ester (II).

EXAMPLE 3

*3,4-seco-$\Delta^{8,24(28)}$-eburicadiene-4-ol-3,21-dioic acid 21-methyl ester (III)*

A solution of 300 mg. of the dimethyl ester of 3,4-seco-$\Delta^{8,24(28)}$-eburicadiene-4-ol-3,21-dioic acid (II) in 30 ml. of 6% KOH in methanol is allowed to stand at room temperature for six hours. The mixture is acidified with hydrochloric acid, the methanol removed in vacuo and the suspension extracted with chloroform. The chloroform extract is dried over sodium sulfate, filtered and the solvent removed in vacuo. The residue (316 mg.) is recrystallized from hexane and furnishes 255 mg. of the pure 3,4-seco - $\Delta^{8,24(28)}$ - eburicadiene-4-ol-3,21-dioic acid 21-methyl ester (III) of the following properties: M.P. 148–150°; [α]$_D^{23}$+100° (c., 0.41 in CHCl$_3$);

$\lambda_{max}^{KBr}$ 3.00, 5.76, 5.84, 6.09, 11.23μ

*Analysis.*—Calcd. for C$_{32}$H$_{52}$O$_5$ (516.74): C, 74.37; H, 10.14. Found: C, 74.33; H, 10.05.

EXAMPLE 4

*3,4-seco-$\Delta^8$-eburicene-4-ol-3,21-dioic acid (VI)*

To a prereduced suspension of 25 mg. of 10% Pd on charcoal catalyst in 95% alcohol (uptake 1.6 ml) is added 25 mg. of 3,4-seco-$\Delta^{8,24(28)}$-eburicadiene-4-ol-3,21 - dioic acid (I) in 2 ml. of alcohol. Reduction is complete after 1.4 ml. of hydrogen has been taken up. (Theory 1.3 ml.) The solution is filtered and evaporated to dryness in vacuo The crystalline residue upon recrystallization from methanol yields the pure 3,4-seco-$\Delta^8$-eburicene-4-ol-3,21-dioic acid (VI) possessing the following properties: M.P. 242–243°; [α]$_D^{23}$+93° (c., 0.4 in alcohol)

$\lambda_{max}^{KBr}$ 3.00, 5.88μ

*Analysis.*—Calcd. for C$_{31}$H$_{52}$O$_5$ (504.73): C, 73.76; H, 10.38. Found: C, 73.50; H, 10.18.

EXAMPLE 5

*3,4-seco-$\Delta^8$-eburicene-4-ol-3,21-dioic acid 3,21-dimethyl ester (VII)*

Fifty mg. of 3,4-seco-$\Delta^8$-eburicene-4-ol-3,21-dioic acid (VI) is suspended in 1 ml. of methanol and methylated by treatment with ethereal diazomethane. The solvents are removed in vacuo yielding amorphous 3,4-seco-$\Delta^8$-eburicene-4-ol-dioic 3,21-dimethyl ester (VII).

EXAMPLE 6

*3,4-seco-$\Delta^8$-eburicene-4-ol-3,21-dioic acid 21-methyl ester (VIII)*

The amorphous dimethyl ester of 3,4-seco-$\Delta^8$-eburicene-4-ol-3,21-dioic acid (VII) obtained in Example 5, is dissolved in 5 ml. of 6% KOH in methanol and allowed to remain at room temperature for six hours. The mixture is then acidified with hydrochloric acid, the methanol removed in vacuo and the suspension extracted with chloroform. The chloroform extract is dried over sodium sulfate, filtered and evaporated to dryness in vacuo. The dihydromonomethyl ester (VIII) is recrystallized from acetone-hexane and furnishes 37 mg. of pure 3,4-seco-$\Delta^8$-eburicene-4-ol-3,21-dioic acid 21-methyl ester (VIII) of the following properties: M.P. 170–172°; [α]$_D^{23}$+76° (c., 0.34 in 95% alcohol);

$\lambda_{max}^{KBr}$ 3.05, 5.78, 5.85μ

NMR (CdCl$_3$): 8.75τ (six protons, 4,4-dimethyl).

Analysis.—Calcd. for $C_{32}H_{54}O_5$ (518.75): C, 74.09; H, 10.49; $OCH_3$, 5.98. Found: C, 73.93; H, 10.49; $OCH_3$, 6.28.

Neutralization equivalent: 513.

EXAMPLE 7

*3,4-seco-$\Delta^8$-eburicene-4-ol-3,21-dioic acid 21-methyl ester* (VIII)

Hydrogenation of 50 mg. of 3,4-seco-$\Delta^{8,24(28)}$-eburicadiene-4-ol-3,21-dioic acid 21-methyl ester in 5 ml. of ethanol in the presence of 50 mg. of 10% palladium on charcoal catalyst yields 3,4-seco-$\Delta^8$-eburicene-4-ol-3,21-dioic acid 21-methyl ester (VIII) after removal of the solvent in vacuo.

EXAMPLE 8

*3,4-seco-$\Delta^{8\ 24(28)}$-eburicadiene-3,4,21-triol* (IV)

A solution of 200 mg. of 3,4-seco-$\Delta^{8,24(28)}$-eburicadiene-4-ol-3,21-dioic acid in 20 ml. of freshly distilled tetrahydrofuran is added dropwise over a fifteen minute period to a suspension of 200 mg. of lithium aluminum hydride in 30 ml. of tetrahydrofuran. The mixture is refluxed for three hours, cooled and 0.5 ml. of saturated sodium sulfate solution is added. The mixture is filtered, the precipitate washed three times with hot chloroform and the solution evaporated to dryness in vacuo. The residue (197 mg.) on recrystallization from acetone gives 160 mg. of pure 3,4-seco-$\Delta^{8,24(28)}$-eburicadiene-3,4,21-triol (IV) of the following properties: M.P. 148–159°; $[\alpha]_D^{23}$ +89° (c., 0.59 in $CHCl_3$)

$\lambda_{max.}^{nujol}$ 3.08, 6.10 11.28$\mu$

NMR ($CdCl_3$): six protons at 8.67$\tau$, two protons at 5.26$\tau$.

Analysis.—Calcd. for $C_{31}H_{54}O_3$ (476.76): C, 78.42; H, 11.47. Found: C, 78.18; H, 11.81.

EXAMPLE 9

*3,4-seco-$\Delta^{8,24(28)}$-eburicadiene-3,4,20-triol 3,21-diacetate* (V)

To a solution of 3,4-seco-$\Delta^{8,24(28)}$-eburicadiene-3,4,21-triol in anhydrous pyridine is added acetic anhydride and the mixture allowed to remain at room temperature for 18 hours. Ice is then added and the mixture further diluted with ice and water. The resulting precipitate is filtered, washed thoroughly with water, dried in vacuo and recrystallized from 95% alcohol yielding 3,4-seco-$\Delta^{8,24(28)}$-eburicadiene-4,21-triol 3,21-diacetate (V).

Similarly, following the procedure set forth in Example 9 but substituting other acid anhydrides and acyl halides for acetic anhydride the corresponding 3,21-diesters are formed. Thus, if benzoyl chloride or methanesulfonyl chloride or propionic anhydride are employed the respective 3,21-dibenzoate, 3,21-dimethanesulfonate and 3,21-dipropionate of 3,4-seco-$\Delta^{8,24(28)}$-eburicadiene-3,4,21-triol are produced.

EXAMPLE 10

*3,4-seco-$\Delta^8$-eburicene-4,24,28-triol-3,21-dioic acid* (IX)

To a solution of 47 mg. of 3,4-seco-$\Delta^{-8,24(28)}$-eburicadiene-4-ol-3,21-dioic acid in 3 ml. of dioxane and 0.2 ml. of pyridine is added dropwise over a thirty-minute period a solution of 26 mg. of $OsO_4$ in 3 ml. of dioxane. The mixture is allowed to remain at room temperature for an additional hour and then decomposed with $H_2S$. The mixture is filtered over a Celite pad and the filtrate is evaporated to dryness in vacuo. The residue (58 mg.) is recrystallized from ethyl acetate with the aid of Darco G-60 and furnishes the 3,4-seco-$\Delta^8$-eburicene-4,24,28-triol-3,21-dioic acid (IX) of the following properties: M.P. 233–235°; $[\alpha]_D$ +68° (c., 0.47 in alcohol)

$\lambda_{max.}^{KBr}$ 2.95, 5.85$\mu$

Analysis.—Calcd. for $C_{31}H_{52}O_7$ (536.73): C, 69.37; H, 9.77. Found: C, 69.45; H, 9.65.

Neutralization equivalent: 269; Calcd.: 268

The invention may be variously otherwise embodied within the scope of the appended claims.

What is claimed is:
1. A compound selected from the group consisting of steroids of the formulae

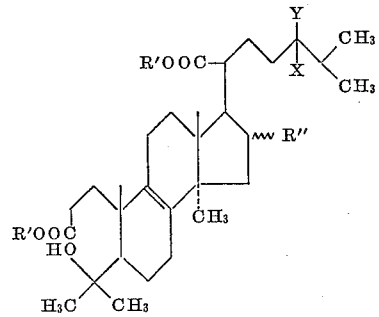

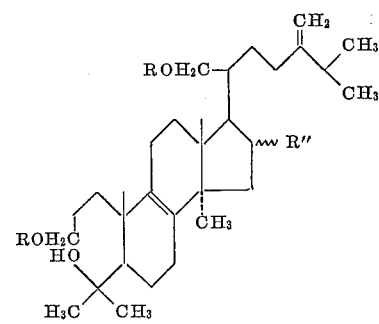

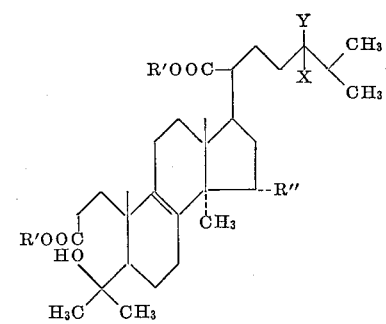

and

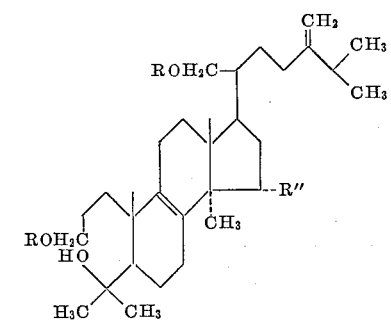

wherein Y is selected from the group consisting of lower alkyl and hydroxy lower alkyl; X is selected from the group consisting of hydrogen and hydroxy; each R' is selected from the group consisting of hydrogen and lower alkyl; each R'' is selected from the group consisting of hydrogen, hydroxy and acyloxy wherein the acyl radical is of a hydrocarbon carboxylic acid of less than twelve carbon atoms; and each R is selected from the group consisting of hydrogen and an acyl radical of a hydrocarbon carboxylic acid of less than twelve carbon atoms.

2. A compound selected from the group consisting of steroids of the formula

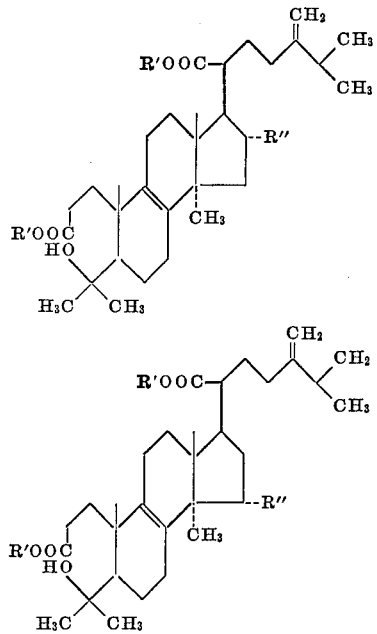

wherein R' and R'' are as defined in claim 1.

3. 3,4-seco-Δ$^{8,24(28)}$-eburicadiene-4-ol-3,21-dioic acid.
4. 3,4 - seco-Δ$^{8,24(28)}$-eburicadiene-4-ol-3,21-dioic acid 3,21-dimethyl ester.
5. 3,4 - seco-Δ$^{8,24(28)}$-eburicadiene-4-ol-3,21-dioic acid 21-methyl ester.
6. 3,4-seco-Δ$^8$-eburicene-4-ol-3,21-dioic acid.
7. 3,4 - seco-Δ$^8$-eburicene-4-ol-3,21-dioic acid 3,21-dimethyl ester.
8. 3,4-seco-Δ$^8$-eburicene-4-ol-3,21-dioic acid 21-methyl ester.
9. 3,4-sec-Δ$^8$-eburicene - 4 - ol - 3,21-dioic acid 21-ethyl ester.
10. 3,4-seco-Δ$^{8,24(28)}$-eburicadiene-3,4,21-triol.
11. 3,4 - secoΔ$^{8,24(28)}$-eburicadiene-3,4,20-triol 3,21-diacetate.
12. 3,4-seco-Δ$^8$-eburicene-4,24,28-triol-3,21 - dioic acid.
13. 3,4 - seco-Δ$^{8,24(28)}$eburicadiene-3,4,21-triol 3,21-dibenzoate.
14. 3,4-seco-Δ$^{8,24(28)}$-eburicadiene-3,4,21-triol 3,21 - dimethanesulfonate.

No references cited.

CHARLES B. PARKER, *Primary Examiner.*

JOSEPH P. BRUST, *Examiner.*

F. D. HIGEL, *Assistant Examiner.*

UNITED STATES PATENT OFFICE
CERTIFICATE OF CORRECTION

Patent No. 3,329,699                  July 4, 1967

Allen I. Laskin et al.

It is hereby certified that error appears in the above numbered patent requiring correction and that the said Letters Patent should read as corrected below.

Column 1, lines 54 to 66, the formula should appear as shown below instead of as in the patent:

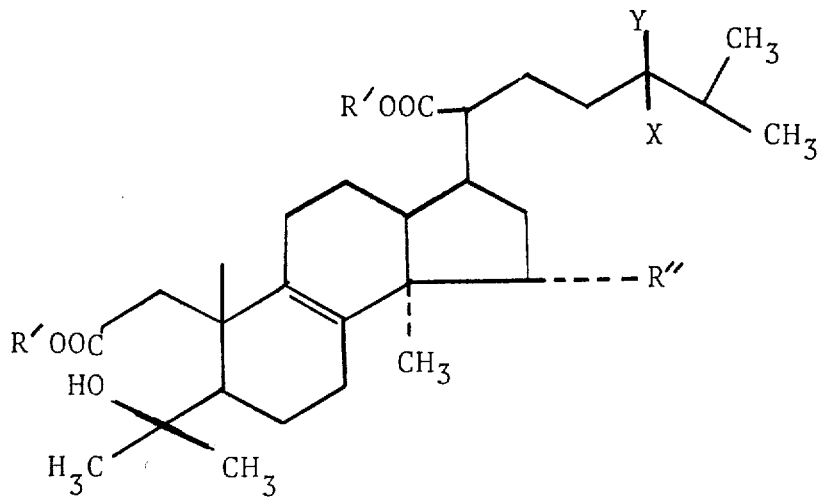

column 5, line 61, for "methlisobutyl" read -- methylisobutyl --; line 67, for "ethanol)" read -- ethanol); --; column 6, line 38, for "vacuo" read -- vacuo. --; line 41, for "alcohol)" read -- alcohol); --; column 7, line 31, for "CHCl$_3$)" read -- CHCl$_3$); --; line 48, for "eburicadiene-" read -- eburicadiene-3, --; line 62, for "aded" read -- added --; line 71, for "alcohol)" read -- alcohol); --; column 9, lines 15 to 30, the formula should appear as shown below instead of as in the patent:

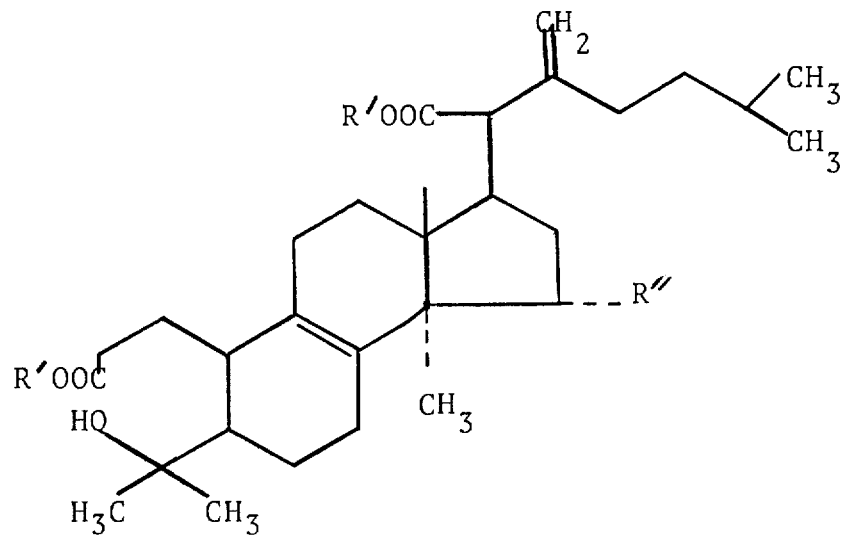

Signed and sealed this 18th day of March 1969.

(SEAL)
Attest:

EDWARD M. FLETCHER, JR.
Attesting Officer

EDWARD J. BRENNER
Commissioner of Patents